US00RE34283E

United States Patent [19]

Barnes

[11] E Patent Number: Re. 34,283

[45] Reissued Date of Patent: Jun. 15, 1993

[54] WAFERBOARD LUMBER

[75] Inventor: Derek Barnes, West Vancouver, Canada

[73] Assignee: MacMillan Bloedel Limited, Canada

[21] Appl. No.: 840,738

[22] Filed: Feb. 24, 1992

Related U.S. Patent Documents

Reissue of:

[64] Patent No.: 4,751,131
Issued: Jun. 14, 1988
Appl. No.: 903,184
Filed: Sep. 3, 1986

U.S. Applications:

[63] Continuation-in-part of Ser. No. 829,564, Feb. 14, 1986, Pat. No. 4,610,913, which is a continuation of Ser. No. 723,641, Apr. 16, 1985, abandoned.

[51] Int. Cl.[5] ..... B32B 3/00

[52] U.S. Cl. ..... 428/15; 428/215; 428/218; 428/326; 428/528; 428/529; 428/535; 156/62.2

[58] Field of Search ..... 428/15, 215, 218, 326, 428/528, 529, 535; 156/62.2

[56] References Cited

U.S. PATENT DOCUMENTS

| | | | |
|---|---|---|---|
| 3,164,511 | 1/1965 | Elmendorf | 428/218 |
| 3,956,555 | 5/1976 | McKean | 156/62.2 |
| 4,061,819 | 12/1977 | Barnes | 428/218 |
| 4,122,236 | 10/1978 | Holman | 428/453 |
| 4,241,133 | 12/1980 | Lund et al. | 428/326 |
| 4,384,019 | 5/1983 | Haataja | 428/326 |
| 4,404,252 | 9/1983 | Hetzler et al. | 428/326 |
| 4,492,726 | 1/1985 | Rosenberg | 428/326 |
| 4,610,913 | 9/1986 | Barnes | 428/326 |

FOREIGN PATENT DOCUMENTS

| | | |
|---|---|---|
| 136844 | 3/1950 | Australia . |
| 597941 | 5/1960 | Canada . |
| 93154 | 12/1959 | Czechoslovakia . |

OTHER PUBLICATIONS

Stofko, J., "The Effect of Molding Pressure on the Physical and Mechanical Properties of a Material Manufactured from Long Oriented Wood Elements", Drevarsky Vyskum 2, No. 1; 81-102 (1957) (translation).

Stofko, J., "The Relation Between the Dimensions and Geometry of Wood Particles and the Mechanical Properties of Wood Particle Boards", Drevarsky Vyskum 5, No. 2: 241-261 (1960) (translation).

Stofko, J., "Particle Board with Oriented Particles", Drevarsky Vyskum, 2, 127-148, (1962) (translation).

Stofko, J., "Particle Board with Oriented Particles", Druna Industrija 21(6), 104-107, (1970) (translation.

*Primary Examiner*—Patrick J. Ryan
*Assistant Examiner*—Abraham Bahta
*Attorney, Agent, or Firm*—C. A. Rowley

[57] ABSTRACT

Substitute lumber pieces having strengths and densities substantially equivalent to lumber are cut from single layer panels of over about 1 and normally less than 4 inches thickness made from wood wafers. The wafers are oriented with their lengths having a mean deviation to the longitudinal length of the panel measured in the major plane of the panel in the range of 0 to 10 degrees and a mean deviation measured in a minimum longitudinal plane perpendicular to the major plane from 0 to about 5 degrees and have an average effective length of at least 8 inches (200 mm), and preferably an average thickness less than 0.15 inches (4 mm) and a width of at least 0.25 inches (6 mm). Lumber is made by cutting the panel longitudinally. Preferably the panels are formed to have a substantially uniform density profile throughout their thicknesses.

6 Claims, 1 Drawing Sheet

WAFERBOARD LUMBER

Matter enclosed in heavy brackets [ ] appears in the original patent but forms no part of this reissue specification; matter printed in italics indicates the additions made by reissue.

This application is a continuation-in part of application Ser. No. 829,564, filed Feb. 14, 1986 (which in turn is a continuation of application Ser. No. 723,641, filed Apr. 16, 1985 now abandoned) now issued as U.S. Pat. No. 4,610,913.

FIELD OF THE INVENTION

The present invention relates to waferboard lumber, more particularly the present invention relates to lumber products formed from wafers oriented to be substantially parallel to the longitudinal axis of the lumber product and a method of producing such product.

BACKGROUND OF THE PRESENT INVENTION

There have been many patents issued and many papers published on the manufacture of lumber-like products from wood particles. Similarly it is common practice to manufacture wafefboard-type panel products from wood particles and there have been a number of articles published.

In the realm of oriented strandboard, the normal practice has been to manufacture a board from particles having a maximum length of up to about 4 inches (100 mm) and many papers and articles have been published advocating 4 inches (100 mm) as a maximum length of wafer.

However, in the recently issued U.S. Pat. No. 4,610,913, issued Sep. 9, 1986 and of which this application is a continuation-in-part, advantages can be obtained utilizing long wafers in forming a layered waferboard product.

Australian patent No. 136,844 issued Mar. 28, 1950 is one of the earlier disclosures relating to the manufacture of lumber from particles. In this patent the particles recommended are sticks, twigs, etc that are oriented in the longitudinal direction of the lumber and secured together. It has also been proposed in Czechoslovakian patent number 93,154 issued Dec. 15, 1959 to Stofko, to produce a moulded product by orienting wood elements in what are broadly defined as profiles such as I, U, T, L and others including pipes and windows, and pressing to consolidate into a finished or semifinished product. The teachings of this patent are further applied by articles published by Stofko in Drevarsky Dyskum 2 No. 1:81-102 (1957); Drevarsky Dyskum 5 No 2:241-261 (1960); Drevarsky Dyskum 2:127-148 (1962) and Drvna Industriaja 21 (6):104-107 (1970). In these articles Stofko discusses panel products and lumber products presumably moulded as taught in his patent and emphasizes the importance of slenderness ratio, i.e. the ratio of length to thickness of the wood particles to obtain the desired structural properties at an acceptable density.

U.S. Pat. No. 3,164,511 issued Jan. 7, 1965 to Elmendorf discloses the manufacture of a lumber product from wafers having length of up to about 6 inches (150 mm), width up to about ¼ inch (150 mm) and thicknesses between 0.005 to 0.02 inches (0.1 to 0.5 mm). To applicant's knowledge no commercial lumber products utilizing such wood particles have been manufactured and sold.

U.S. Pat. No. 3,956,555 issued May 11, 1976 to McKeen describes the manufacture of a laminated beam from a combination of oriented and random wood particles in a press by laying alternative strips of oriented and random particles and then consolidating under pressure to form a panel and splitting the oriented strips to divide the panel in to structures having end side sections that are oriented and would function similar to flanges of an I beam interconnected by a random oriented section that would function as the web of an I beam. This is a relatively complicated structure with limited strength and suitable only for use with the products oriented to be loaded perpendicular to the split faces.

As far as applicant is aware, the product described in U.S. Pat. No. 4,061,819 issued Dec. 6, 1977 to the present inventor describes the only commercially viable suitable lumber product formed from wood particles (strands). This patent teaches the use of relatively long strands to obtain structural products having physical characteristics including density and strength characteristics similar to, and in some cases better than, those of the natural wood product it replaces.

U.S. Pat. No. 4,122,236 issued Oct. 24, 1978 to Holman describes an artificial lumber product moulded from splinters having a length of the range of about 2 to 10 inches.

Generally when waferboards (panels) or the like are made, the density profile through the panel is such that the skins of the panel have maximum density and the core has the least density. States another way, the strength of the skins of the panel is higher than the strength of core, however, since panels are normally used with the core extending along the neutral axis of the bending moment such a density distribution is not a major factor in determining bending strength. It is known that the rate of pressure application in a press can be used to change the density profile through the thickness of the panel. Also in a continuous pressing operation the rate of temperature rise coordinated with the rate of pressure application can be used to change the density profile with thickness to the panel.

It is economical to product wafers since the wafers are normally produced by a blade having spaced edges equal in length to the length of the wafer to be produced cutting substantially parallel to the grain. In some cases flat blades cutting parallel to the grain are used with spaced spurs cutting perpendicular to the grain to define the length of the wafers. Wafers so produced are generally relatively thin and have a width many times greater than their thickness (thickness being determined by the depth of cut of the blade and the width being determined by the deflection of the cut wafer by the breaker bar of the knife).

BRIEF DESCRIPTION OF THE PRESENT INVENTION

It is an object of the present invention to provide a lumber product formed utilizing waferboard technology and wafers having the following average geometry; length at least 8 inches (200 mm) maximum thickness of 0.15 inches (4 mm) and a width of at least 0.25 inches (6 mm) to provide a relatively inexpensive lumber product having physical characteristics similar to or better than those obtained from lumber made from the same species as the wood flakes.

Broadly the present invention relates to a waferboard lumber product and a method of making same, said waferboard lumber product comprising discrete lengths of lumber having thicknesses of at least 1 inch (25 mm) made from a single layer panel formed from wood wafers, said wafers being oriented to have their lengths orientated to the longitudinal length of the panel measured in the major plane of said panel with a mean deviation of 0 to 10 degrees and a mean deviation measured in a minor longitudinal plane through the panel perpendicular to the said major plane of from 0 to 5 degrees, said wafers having an average effective length of at least 8 inches (200 mm) said lengths of lumber having cut edges defined in said panel by cuts extending substantially longitudinally of said panel said cuts being spaced defined the width of said lumber.

Preferably said wafers will have a maximum average thickness of 0.15 inches (4 mm) and an average width of at least 0.25 inches (6 mm).

Preferably said lumber product will have a substantially uniform density to thickness profile.

Present invention also relates to a method of making a lumber product comprising laying up a single layer panel having a thickness of at least 1 inch (25 mm) from a plurality of wafers, orienting the longitudinal length of said wafers relative to the longitudinal axis of said panel so that the mean deviation of the lengths of said wafers to said longitudinal axis of said panel measured in the major plane of said panel is in the range of 0 to 10 degrees and a mean deviation measured in a longitudinal plane through said panel perpendicular to said major plane of from 0 to 5 degrees, said wafers having an average effective length of at least 8 inches (200 mm) consolidating said layup of wafers under heat and pressure to set adhesive coating said wafers and consolidate said layup into said panel having a substantially uniform density to width profile and cutting the panel along spaced longitudinally extending lines to divide said panel into a plurality of discrete lumber lengths having a width equal to the spacing between said longitudinal cuts.

Preferably the consolidating conditions will be controlled to yield a panel having a substantially uniform density to thickness profile.

Preferably the density of the lumber products so produced will be in the order of 25 lb/ft$^3$ (0.4 g/cm$^3$) through 50 lb/ft$^3$ (0.8 g/cm$^3$). Also preferably the density will not deviate more than 3% from the mean through the panel thickness.

BRIEF DESCRIPTION OF THE DRAWINGS

Further features, objects and advantages will be evident from the following detailed description of the preferred embodiments the present invention taken in conjunction with the encompanying drawings in which.

DESCRIPTION OF PREFERRED EMBODIMENTS

The term wafer used throughout this disclosure is intended to define wood particles formed by a waferizer as distinct from pulp chips, sawdust, particles or lengths cut directly from a round log or formed by clipping veneer. The size of the sliced wafer used with the present invention, particularly the length which is always measured in the fiber direction, i.e. parallel to the longitudinal axis of the fibers, is critical to obtaining the required strength to provide a lumber product to replace conventional lumber with a product having essentially the same strength as the lumber being replaced and without a significant change in density.

Figure 1:
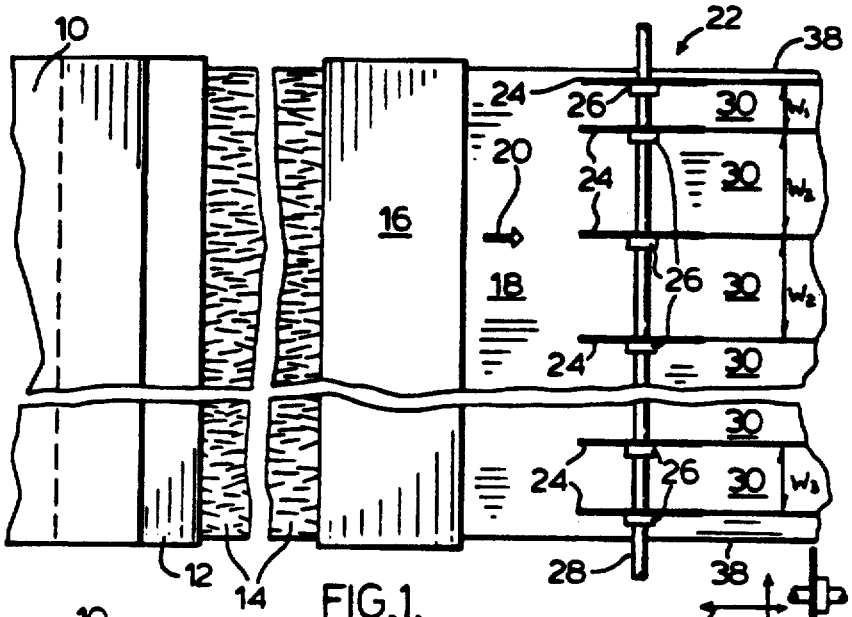
FIG. 1 is a schematic plan view of a plan for carrying out the present invention.

Referring to FIG. 1, adhesive coated wood wafers are brought to the layup forming equipment via a suitable in-feed device wherein the wafers are relatively uniformly laterally spread and are then fed to an orienting device 12 (see for example U.S. Pat. No. 4,494,919 issued Jan. 22, 1985 to Knudson et al) that orients the wafers with their longitudinal dimensions substantially aligned as will be described in more detail here below. In the illustrated arrangement the mat 14 so formed has a substantially uniform density to width profile and is either layed on a caul plate and transported to a press such as a multiopening press schematically illustrated in 16 or is carried by a continuous belt or the like to a continuous press 16 and the mat or layup 14 is pressed and consolidated to form a panel 18, say a panel having a total width of 8 feet (2400 mm) and the required thickness (e.g. for nominal 2 inch (50 mm) lumber the consolidated panel must have a 1½ inch (38 mm) thickness). If a continuous press 16 is used panel 18 is continuously moved from the press 16 in the direction of arrow 20, i.e. in the longitudinal direction of the wafers which is the direction in which the wood fibers are aligned in the wafer, into the cutting station 22. If the press 16 is not a continuous press, i.e. is a multiopening press or the like the mat 14 is carried on a caul plate to be consolidated into a panel, the panel will be withdrawn as indicated by arrow 20, separated from their respective caul plates (not shown) and fed one following the other in the direction of the arrow 20, i.e. with the length of the wafers aligned with the arrow 20 into cutting station 22.

Figure 2:
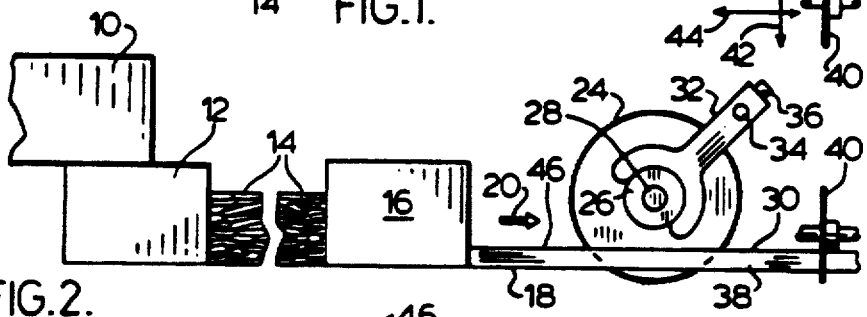
FIG. 2 is a schematic side elevation of the plan of FIG. 1.

Cutting station 22 as schematically illustrated is made up of a plurality of spaced circular saws or cutters 24 axially moveably mounted via hubs 26 on a shaft 28. Hubs 26 are mounted in a conventional manner to be driven by the shaft 28 and yet slidable axially on shaft 28 so that the position of the saws 24 may be adjusted thereby adjust the width of the spaces between the saws which determines the width as indicated by the dimensions W1, W2, W3, etc., of the lumber products 30 formed from panel 18 (which may be any appropriate width). FIG. 2 further provides a schematic illustration of an automatic spacing device adapted to adjust spacing between saws 24 including a yoke 32 that engages its respective hub 26 and is moved along a shaft 34 by a suitable drive bar 36. There will be one drive bar 36 for each yoke 32 and one yoke 32 for each of the blades 24 to in known manner adjust the position of the saw 24 along the shaft 28. Generally the spacing of the saws or cutters 24, i.e. widths W1, W2, etc, will be greater than the thickness T of the panel.

The two outermost blades, i.e. the top and bottom blade 24 in FIG. 1 are used to trim the panel 18 and provide trimmed strips as indicated at 38.

A suitable cut off saw schematically indicated at 40 traverses the panel 18 after the appropriate length of cut boards 30 has passed the saws 24 to cut the boards off to the required lengths. In continuous operation the saw 40 will move both transversely and longitudinally so that a square cut is provided across the width the panel 18 (see the arrows 42 and 44 in FIG. 1) and where discrete panels 18 are formed on caul plates the cut off saw may not be necessary but may be useful for trimming to length.

It is intended that press 16 be operated as above indicated to provide a panel 18 of adequate strength which requires that wafers having at least an average length of about 8 inches (200 mm) (length is always considered as measured in direction of the grain of the wafer) preferably an average length of 10 to 24 inches (250–600 mm) be used. Normally such wafers will be cut at an average thickness not exceeding 0.15 inches (4 mm), preferably less than 0.1 inches (2.5 mm) with the thicker wafers normally being used to produce the thicker panel. The wafers will preferably have an average width of at least 0.25 inches (6 mm), more preferably at least 0.5 inches (12 mm) and in many cases will have a width to thickness ratio of over about 10.

Figure 3:
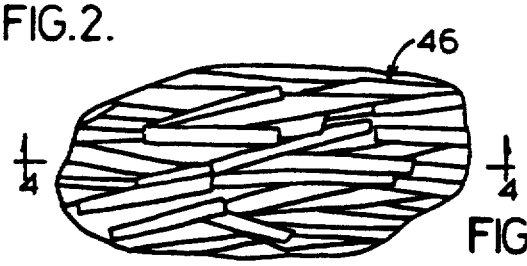
FIG. 3 is a partial plan view of a board or panel constructed in accordance with the present invention, illustrating the lay of wafers therein.
Figure 4:
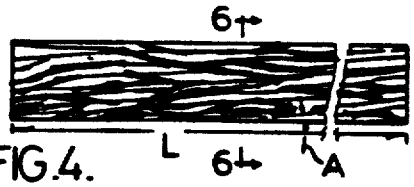
FIG. 4 is a sectional view along the line 4—4 in FIG. 3.
Figure 5:
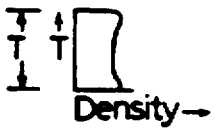
FIG. 5 is a graph of density versus thickness illustrating a preferred density profile with thickness through the board of FIG. 4.
Figure 6:
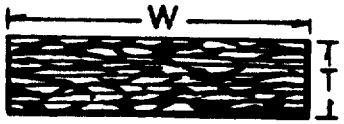
FIG. 6 is a sectional view along line 6—6 in FIG. 4.

The wafers must be oriented with their length direction aligned relative to the longitudinal direction of the lumber which as above indicated is formed by cutting substantially parallel to the longitudinal direction of the panel 18 or parallel to the direction of outfeed from the press 16. This orientation will never be 100% in the machine direction, i.e. parallel to the longitudinal axis of the panel 18 and the axial length of the lumber products 30, but will be such that the mean deviation of the wafer lengths (fiber direction) from the longitudinal axis of the panel 18 and thus form the longitudinal axis of the lumber product is within the range of approximately 0 to 10 degrees when measured in the major plane of the panel 18, i.e. measured on say the upper surface of the panel 18 as indicated at 46 in FIGS. 2 and 3. The mean deviation measured in a plane extending longitudinally to the panel 18 or boards 30 say parallel to the cut faces formed by the saws 24 (i.e. perpendicular to the plane 46) will normally be in the range of 0 to 5 degrees as schematically illustrated by the angle A in FIG. 4. The angle A will preferably be small closer to the 0 to 3 degrees since if the angle A is too large and wafers extend almost from one major surface of the panel to the other, a weak product will be produced and this must be avoided.

Press cycle will be controlled (including the rate of change of temperature assuming a continuous press) depending on the product to be produced but normally will be such that the density to thickness profile is substantially constant, i.e. a deviation of less than 3% from the mean for a normal lumber product. Generally the faces of the panel 18 contacting the press plates will have a slightly higher density than the central portion of the panels. If the lumber product is to be used as planking, i.e. with the loading perpendicular to the major face, it may be desirable to manufacture a panel with distinct core and surface layers with the surface layers having a significantly higher density than in the core. With a plank the deviation in density from the mean may be as high as 10% depending on the relative thickness of the dense surface layers to the less dense core portion.

The uniform profile of density to thickness is significantly more important with the structural lumber product of the present invention which will normally be loaded perpendicular to its cut or edge face, i.e. parallel to the face represented by surface 46 of panel 18 so that the major faces of the panel which contact the platens of the press will be aligned with the load and the center or core of the panel no longer forms the neutral axis when the structural member is being stressed.

In the operation of the present invention suitable wafers as above described are first formed in a mat 14 of approximately 4 times the desired finished thickness of the panel 18 which will normally limit the maximum thickness of the panel to about 4 inches (100 mm). The wafers will be precoated with adhesive normally a phenol formaldehyde resin although isocyanates may also be used or any other suitable adhesive. Normally if phenol formaldehyde is used a dried powdered resin will be used although with proper application a wet or liquid resin may also be used. Change in resin may require a change in the pressing schedule to ensure proper curing of the resin when the mat is under pressure.

Assuming the lumber to be produced is nominal 2 inch 50 mm) thick lumber then the thickness of the panel 18 will be 1½ inch (40 mm) and the cutters 24 will be separated to cut the panel 18 into strips and to produce a 2×6; 2×8; 2×10; 2×12; or even 2×16 inch; etc, lumber as desired. Generally the wider the width dimension the more valuable the product yet it is as easy to manufacture a 2×16 inch board as it is to manufacture a 2×4 utilizing the present invention and any desired product mix may be made. Furthermore, if a continuous press is used the length of the boards so formed is determined simply by activation of the cutoff saw 40 to cut the boards to the desired length. If caul plates are used the saw 40 may simply be used to trim the lumber to length or alternatively it could be trimmed at some other stage. In this case the maximum length is determined by the length of the caul plate.

EXAMPLE 1

A single layer oriented wafer mat was hand felted aspen wafers onto an 8 foot (2400 mm) long caul plate. The wafers used were 12 inches long and 0.025 inches (0.6 mm) thick and 1¼ inch (30 mm) wide and were produced at MacMillan Bloedel's Thunder Bay Division. 5% powder phenol formaldehyde resin and 2% slack wax were applied to the wafers. A matching 8 foot caul plate was placed on top of the mat before pressing. The felted wafer mat was then advanced through a hot press (in the Research Centre under lab conditions) in 2 foot stages. Each stage was pressed for 20 minutes at a press temperature of 210° C. The resulting product had a thickness of 1½ inches and an average density of 40 lb/ft$^3$ (0.64 grams/cc). The modulus of elasticity (MOE) of the section so produced was 1,697,000 psi (11.70 GPa) measured while applying forces parallel to the faces formed by the caul plates, i.e. in a direction equivalent to perpendicular to the cut faces of the lumber product.

It will be apparent that the pressing of this sample was not under ideal conditions so that the panel produced was far from ideal. However the sample clearly indicates that the modulus of elasticity (MOE) is at least equivalent to that for conventional lumber of the grade specified and at a reasonable density.

EXAMPLE 2

In a further attempt to determine the applicability of utilizing wafers that are relatively inexpensive, a relatively thin aspen veneer 0.05 inch (1 mm) thick at 10% moisture content was clipped to 12 inch length by ½ inch width strips to make an 8 foot long, 11 inch wide by 2½ inch thick oriented lumber billet utilizing a continuous press, microwave heating, 6% powdered phenol formaldehyde resin and 2% slack wax. A mat was formed from wafers precoated with adhesive and oriented to substantially align with the length of the lumber product and passed through the press over a period of 9 minutes. The actual [specific gravity] *density* of the resultant lumber was [46] *40* lb/ft$^3$ (0.64 grams/cc) at 12% moisture and the resulting board had an average MOE of 1,650,000 psi and a modulus of rupture (MOR) of 6900 psi.

Another board made in a similar manner had a specific gravity of 39 lb/ft$^3$ (0.54 g/cc), a MOE of 1,500,000 psi and a MOR of 5,500 psi.

Examples 1 and 2 clearly demonstrate that it is practical to manufacture lumber products having acceptable physical characteristics for structural lumber applications when made from a species such as aspen which is not a good species for such materials and at a final density that while higher than aspen is similar to that of many species.

Having described the invention modifications will be evident to those skilled in the art without departing from the spirit of the invention as defined in the appended claims.

What is claimed is:

1. A waferboard lumber product comprising discrete lengths of lumber each having a thickness of at least 1 inch (25 mm) and being cut from a single layer panel made from wood wafers *having an average thickness as cut by a waferizer of less than 0.05 inches (1.25 mm) and an average width of greater than 0.5 inches (12.5 mm), and a width to thickness ratio of at least 10 to 1, substantially all of* said wafers having been oriented with their lengths having a mean deviation to the longitudinal axis of the panel measured in the major plane of said single layer panel in the range of 0 to 10 degrees and a mean deviation measured in a minor plane extending longitudinally of said panel and perpendicular to said major plane of from 0 to 5 degrees, said wafers having an average length measured in the grain direction of the wafer of at least 8 inches (200 mm), said discrete lengths of lumber each having a pair of cut edges spaced to define the width of said lumber products said cut edges extending substantially parallel to said longitudinal axis of said panel from which said lumber is cut. *said lumber product having an MOE of at least 1,500,000 psi at a density of 40 lb. per cubic foot.*

2. A lumber product as defined in claim 1 wherein said lumber product has a density within the range of 25-50 lb/ft$^3$.

[3. A lumber product as defined in claim 2 wherein said wafers have an average thickness of less than 0.15 inches (4 mm) and an average width of at least 0.25 inches (6 mm).]

4. A lumber product as defined in claim 2 wherein said mean deviation measured in said minor plane is in the range of 0 to 3 degrees .

[5. A lumber product as defined in claim 2 wherein said average width is at least 0.5 inches.]

6. A lumber product as defined in claim 2 wherein said wafers have a mean length of between 10 and 24 inches (250-600 mm).

7. A lumber product as defined in claim 2 having a substantially uniform density to thickness profile.

8. A lumber product as defined in claim 2 wherein said density profile to thickness has a deviation from the mean density of less than 3%.

[9. A lumber product as defined in claim 3 wherein said wafers have an average thickness of less than 0.1 inches (2.5 mm).]

* * * * *